Figure 1:
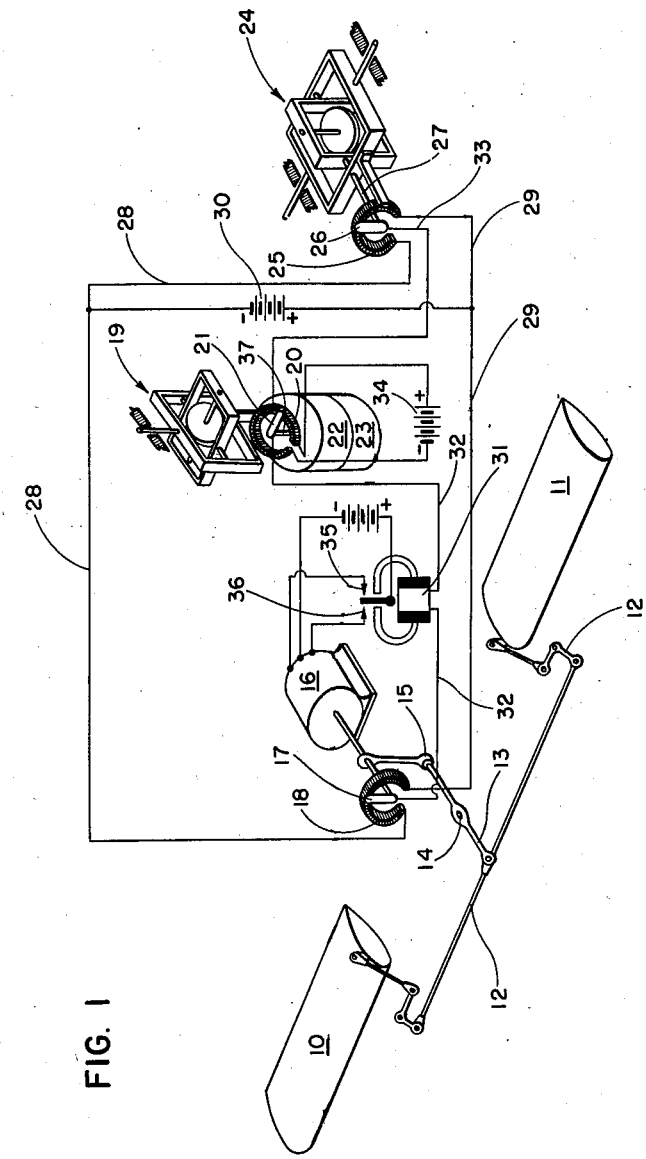

June 12, 1951

A. SIVITZ ET AL

2,556,345

AIRCRAFT CONTROL SYSTEM

Filed May 7, 1949

2 Sheets-Sheet 1

*INVENTOR.*
PHILIP L. RUBY
BY   AARON SIVITZ

*ATTORNEY.*

June 12, 1951

A. SIVITZ ET AL 2,556,345

AIRCRAFT CONTROL SYSTEM

Filed May 7, 1949

2 Sheets-Sheet 2

INVENTOR.
PHILIP L. RUBY
AARON SIVITZ

BY

ATTORNEY.

Patented June 12, 1951

2,556,345

UNITED STATES PATENT OFFICE 2,556,345

AIRCRAFT CONTROL SYSTEM

Aaron Sivitz, Columbus, Ohio, and Philip L. Ruby, Jackson, Mich., assignors to Curtiss-Wright Corporation, a corporation of Delaware Application May 7, 1949, Serial No. 91,952

10 Claims. (Cl. 244—77)

The invention relates to remote control apparatus for aircraft, and especially to the part of the apparatus of this kind that is carried aboard the aircraft.

According to the invention both roll and yaw movements of the aircraft are effected by the same means which may comprise motor operated ailerons hinged to the trailing edges of the aircraft's wings in the usual manner. The aircraft is automatically maintained in a wings-level or unbanked attitude by a roll gyro and is automatically held on whatever heading is selected by a yaw gyro. The roll gyro operates a variable resistor that is arranged in a bridge circuit with another variable resistor operated by the aileron motor, the potential across the output terminals of the bridge being employed to control the motor. The yaw gyro operates still another variable resistor that is arranged to apply a biasing potential across the bridge output terminals, so as to superimpose automatic yaw control upon the roll control system.

The aforementioned arrangement requires only a single control surface actuating motor to effect control of the aircraft about the roll and yaw axes, and only a single means, for example a polarized relay, to control the motor. Another advantage is that with this arrangement the degree of bank, and hence the rate of turn, varies in proportion to the angle of any correction that is signalled by the direction gyro. In this way sharp turns are made to effect large angular corrections while only gentle turns are made to effect small corrections, so that overcontrol and hunting are minimized.

Pilot control to vary the heading of the aircraft is effected by changing the reference plane of the yaw gyro. For this purpose a directional control motor is arranged to operate the same variable resistor that is operated by the yaw gyro. This is made possible by a suitable differential arrangement so that either the motor or the gyro can operate the variable resistor, a simple differential arrangement for this purpose being one in which the motor operates one part of the resistor while the gyro operates another, and relatively movable, part of the same resistor.

According to the invention the directional control motor is selectively controlled through radio operated means in such manner that the aircraft either may be caused to turn continuously, so long as a turn signal persists, or may be caused to turn through only a given angle or increment of turn for each turn signal. To effect this result the control means for the motor are made to respond to two different kinds of signals, continuous turn signals and incremental turn signals. The apparatus is arranged to respond to any number of successively given incremental turn signals, so that the operator by giving one or more of them can cause the airplane to turn through any selected angle. In this way the aircraft may be made to fly a precise pattern without visual reference and without timing the turns.

Figure 2:
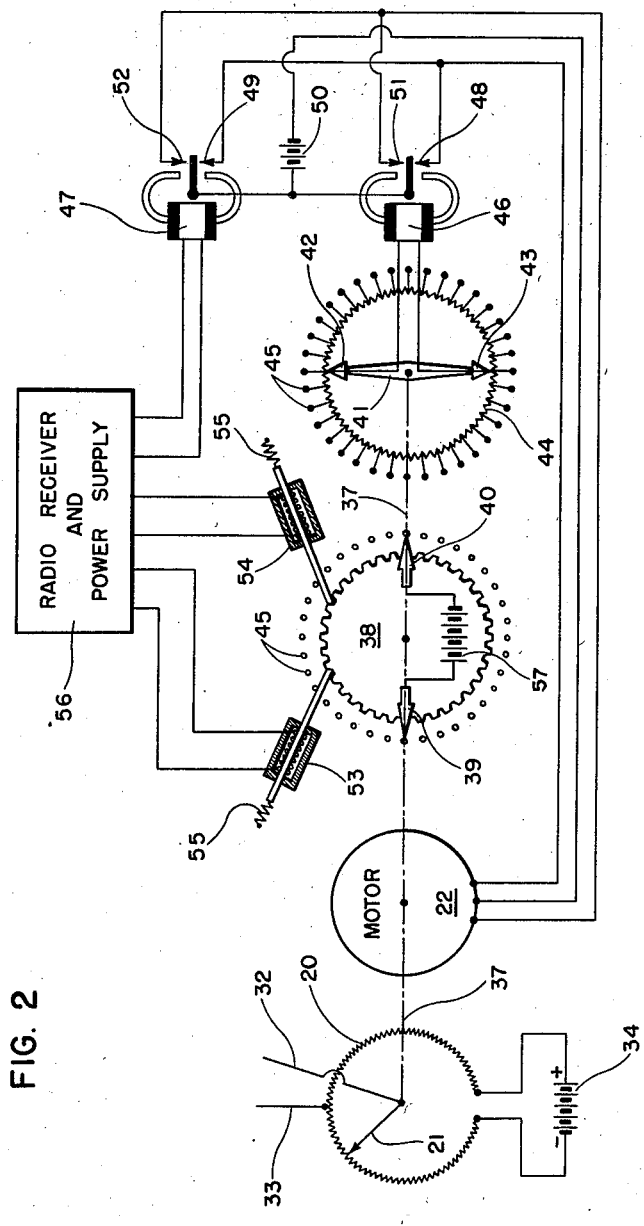

The foregoing and other objects and advantages will appear from the following description of the embodiment of the invention shown in the accompanying drawings, wherein:

Fig. 1 is a diagrammatic view showing the aileron operating system including the aileron operating motor, the bridge circuit for controlling this motor, and the roll and yaw gyros for imposing automatic control upon the bridge circuit; and Fig. 2 is a diagrammatic view showing the means associated with the bridge circuit of Fig. 1 for imposing constant turn and/or incremental turn signals upon the automatic system of Fig. 1.

As shown in Fig. 1 the right aileron 10 and left aileron 11 are connected by a linkage 12 with a lever 13 which is pivoted to swing in a horizontal plane about a fixed pivot 14. One end of the lever is connected by a ball-and-socket joint 15 to an arm mounted on the shaft of aileron operating motor 16, the latter also operating the movable contact 17 of a follow-up variable resistor or potentiometer 18. The arrangement is such that as the motor shaft and contact 17 turns clockwise (as the parts are viewed in Fig. 1) the trailing edge of aileron 10 will lower and that of aileron 11 will rise to cause the airplane to bank to the left.

For automatically keeping the airplane on a selected heading the yaw gyro 19 is provided. The outer gimbal ring of this gyro, which swings relative to the airplane about a vertical axis as the airplane turns, carries the resistance element 20 of another variable resistor or potentiometer whose movable contact 21 is operated by a motor 22. The means for operating this motor 22 are shown in Fig. 2, the parts of such means that are coaxial with the motor being contained in a housing 23 shown adjacent the motor in Fig. 1.

The roll gyro 24 is provided to automatically maintain the airplane in an unbanked attitude or in a selected degree of bank. The outer gimbal ring of this gyro carries the resistance element 25 of still another variable resistor or potentiometer whose movable contact 26 is mounted on a shaft 27 extending from the inner gimbal ring of the gyro. This inner gimbal ring turns relative to the element 25 about the longitudinal or roll axis of the airplane when the latter changes its degree of bank.

The follow-up potentiometer 17, 18 and roll potentiometer 25, 26 are arranged to form a bridge circuit whose output current controls the aileron operating motor. To this end a lead 28 connects one end of resistance 18 with one end of resistance 25, while the opposite ends of these resistances are connected by a lead 29. Leads 28 and 29 constitute the input terminals of the bridge and connected across them is a battery or other electric current source 30. The movable contacts 17 and 26 of the potentiometers constitute the output terminals of the bridge and connected between them in series are the windings of a three-position motor control polarized relay 31 and the potentiometer 20, 21. As is indicated in Fig. 1, but shown more clearly in Fig. 2, the lead 32 from contact 17 and relay 31 is connected to the potentiometer movable contact 21 while the lead 33 from contact 26 is to a center tap of the potentiometer resistance element 20. Connected across the end terminals of the latter is a battery or other electrical energy source 34. The stationary contacts 35 and 36 of polarized relay 31 are connected respectively to the forward and reverse windings of motor 16, while a battery or the equivalent thereof is connected between the common terminal of these windings and the movable contact of the relay.

When the reversible motor 22 is de-energized in the position thereof wherein potentiometer contact 21 is adjacent at the center tap of the related resistance element 20, so that none of the potential of battery 34 is applied to the bridge circuit, the airplane will be maintained automatically in straight, unbanked flight by action of the gyros 19 and 24. As an example of this operation of the apparatus shown in Fig. 1, assume that air currents bank the airplane to the right. The gyro 19 will not be affected by the bank because of its gimbal mounting, provided the airplane does not turn about its vertical axis, but the gyro 24 will move potentiometer contact 26 in a clockwise direction as the parts are viewed in Fig. 1. The bridge circuit will be unbalanced by this action, and current will flow from the positive terminal of battery 30, through the short side of potentiometer resistance element 25, contact 26, to the left through relay leads 32 and 33, relay windings 31, potentiometer contact 17, resistance element 18 and return to the negative terminal of the battery through lead 28.

As a result the relay contact 36 will close, energizing the motor 16 to lower aileron 10, raise aileron 11, and simultaneously to move the follow-up potentiometer contact 17 clockwise. This action will continue until the bridge is again balanced, at which time relay 31 and motor 16 will be de-energized, with ailerons 10 and 11 deflected. As the airplane responds to this deflection by left roll toward an unbanked attitude, the roll gyro 24 will respond by moving the potentiometer contact 26 counterclockwise. This will result in an opposite unbalance of the bridge circuit, causing current to flow to the right through relay windings 31 and thereby causing relay contact 35 to close. This energizes the motor to raise aileron 10, lower aileron 11 and turn follow-up potentiometer 17 counter-clockwise, this action continuing until, upon return of the airplane to wings-level flight, the bridge is again balanced and the relay and motor are deenergized.

Should the airplane yaw to the right from its intended heading, the yaw gyro will cause potentiometer contact 21 to move clockwise along the related resistance element 20 away from center tap connection of lead 33. This will cause a biasing potential to be applied from battery 34 across the output terminals of the bridge, with the current flow being from the positive terminal of the battery through lead 32 to the left through relay windings 31 and return through lead 33 to the negative terminal of the battery 34. The result will be the same as in the example above, i. e. the ailerons 10 and 11 will be displaced to cause the airplane to roll to the left and begin to turn to the left toward its intended heading.

As the ailerons are displaced to effect roll to the left and left turn, the bridge will be unbalanced by action of the follow-up potentiometer 17, 18, so that potential of battery 30 will oppose the current flow from battery 34 through the relay windings. As the left bank is entered the roll gyro will operate potentiometer 25, 26, moving contact 26 counter-clockwise, further unbalancing the bridge in a direction to oppose the current from battery 34 through the relay windings; and, when the total potential opposing that applied by potentiometer 20, 21 finally exceeds it, the current through the relay windings will be reversed, operating the motor to restore the ailerons to their neutral position and thereby stopping the roll. As the left turn of the aircraft continues and the potential applied by potentiometer 20, 21 decreases, the aircraft will be caused to roll to the right, decreasing the degree of left bank to zero by the time the aircraft is returned to the intended heading.

It will now be seen that the apparatus shown in Fig. 1 will automatically maintain the aircraft in straight flight on the heading determined by the angular position of the potentiometer contact 21, and it will be seen that the heading may therefore be varied by rotating the contact 21 through suitable means such as shown in Fig. 2. It will also be understood that with the system described the degree of bank is automatically made proportional to the amount of correction of roll or turn that is needed to restore the airplane to straight flight on the selected heading, quick turns being made when large corrections are signalled, and very gentle turns when small corrections are signalled.

As indicated in Fig. 2 the movable contact 21 of the yaw potentiometer is fixed on the shaft 37 of motor 22. Also mounted on this shaft, and contained in housing 23 shown in Fig. 1, are a toothed wheel 38 carrying insulated contacts 39 and 40, and an arm 41 carrying insulated contacts 42 and 43. Wheel 38 is free to rotate on shaft 37 while arm 41 is affixed to the shaft. Extending around the arm 41 and engaged at opposite points of its circumference by contacts 42 and 43 is a circular resistance element 44. This element has fixed contacts 45 at spaced intervals therearound, any opposite pair of these fixed contacts being engageable by contacts 39 and 40 by suitable rotation of toothed wheel 38. It will be understood that the contacts 45 shown in the drawing as disposed circumferentially around wheel 38 are the same contacts 45 shown side by side to simplify the illustration whereas in reality one of them is superimposed upon the other, both being mounted on the shaft 37.

The four sections of resistance element 44 which are situated between the four contacts, 39, 42, 40 and 43, constitute four resistance arms of a Wheatstone bridge of which the contacts 39 and 40 may be considered to be the input terminals and contacts 39 and 40 while the windings of a three-position polarized relay 46 are connected across contacts 42 and 43.

The reversible motor 22 is controlled jointly by relay 46 and by a similar polarized relay 47.

When either relay is energized with current of one polarity, its lower fixed contact, i. e. contact 48 of relay 46 or contact 49 of relay 47, is closed by its movable contact to connect the forward windings of motor 22 with electric power source 50; and when either relay is energized with current of the opposite polarity, one of the upper relay contacts, 51 or 52 respectively, is closed to cause the reverse windings of motor 22 to be energized by current source 50.

The wheel 38 may be moved clockwise in a step-by-step manner by successive energizations of a solenoid 53 whose armature is engageable with the toothed periphery of the wheel. Similarly the wheel may be moved step-by-step in a counter-clockwise direction by successive energizations of a similar solenoid 54. Springs 55 return the armatures to their rest positions after each operating stroke thereof.

The relay 47 and the solenoids 53 and 54 are selectively energized by a radio receiver and power supply unit 56 in response to selective radio signals sent from a remote radio transmitter. The details of the unit 56 form no part of the present invention, and as suitable apparatus for this purpose is well known in the radio art it will be sufficient for the present invention to point out that the unit 56 may supply current of either polarity to relay 47, to thereby effect continuous rotation of the motor 22 in either direction for so long as such current persists; or may supply current to energize either of solenoids 53 and 54. Obviously, when the motor is being operated continuously in either direction through the action of relay 47 rather than the bridge-controlled relay, the bridge arm 41 is disconnected from the motor by any suitable declutching means. When contact 49 of relay 47 is closed so that motor 22 turns the shaft 37 and the potentiometer contact 21 continuously in a clockwise direction, a continuous right turn signal is given to the apparatus shown in Fig. 1, current from the battery 34 passing to the right through relay windings 31. Similarly when contact 52 of relay 47 is closed a continuous left turn signal is given.

On each energization of solenoid 53 the wheel 38 will be advanced one tooth, which is ten degrees in the illustrated embodiment where the wheel is provided with thirty-six teeth and the resistance 44 with thirty-six fixed contacts 45. Such advance will result in decrease of the resistance between contacts 39 and 42, and between contacts 40 and 43; and increase in the resistance between contacts 43 and 39, and between contacts 42 and 40. Consequently current will flow from the positive terminal of battery 57 through the low resistance arms of the bridge and through the relay windings 46 in a direction such that relay contact 48 will be closed, causing motor 22 to move potentiometer contact 21 clockwise through ten degrees. After this amount of travel, which will also carry contacts 42 and 43 clockwise through ten degrees, the bridge will again balance, de-energizing relay 46 and the motor 22. The resulting movement of potentiometer contact 21 clockwise through ten degrees will, through functioning of the apparatus shown in Fig. 1, cause the airplane also to turn ten degrees to the left. In other words, movement of contact 21 clockwise introduces a right-of-heading error signal into the apparatus, causing the airplane to turn to the left an amount sufficient to cancel the signal. By several successive energizations of the selected one of solenoids 53 and 54 a turn in either direction through any number of ten-degree increments may be made. For example, if solenoid 54 is energized nine times in succession, the bridge circuit shown in Fig. 1 will be unbalanced until the aircraft has executed a ninety degree turn to the right.

It will now be understood that the invention provides a means whereby a remote operator may cause the aircraft to execute continuous turns in either direction for so long a time as the turn signals persist or may cause the aircraft to execute turns in either direction through preselected angles without visual reference and without regard to the time required to complete such turns.

It will be understood further that the foregoing description is made by way of example and illustration of the inventive principles involved, and not by way of limitation; there being no intention to limit the invention except as required by the appended claims.

The invention claimed is:

1. In an aircraft control system, aileron means and a reversible motor therefor, a variable resistor operated by said motor, a roll gyro and a variable resistor operated thereby, said variable resistors being arranged in a bridge circuit, a polarized relay responsive to the potential across the output terminals of said bridge circuit and arranged to control said motor for operation in either direction, a variable resistor arranged to apply a potential of either polarity across said bridge output terminals, a yaw gyro and a reversible motor arranged to differentially operate the last mentioned variable resistor to respectively impose automatic yaw control and selection of heading upon the aileron operating system, a pair of polarized relays arranged in parallel to control said last-mentioned motor for operation in either direction, a second bridge circuit comprising a circular resistor having two pairs of contacts rotatable thereon, one of said pairs constituting the input terminals of the bridge circuit and the other of said pairs the output terminals thereof, one of said pair of relays being connected across said output terminals of the second bridge circuit, one of said pairs of contacts being rotatable by said last-mentioned motor, stepping means for rotating the other one of said pairs of contacts, and means for selectively operating said stepping means and the other of said pair of relays to thereby selectively cause incremental turns and continuous turns of the aircraft.

2. In combination with an aircraft having a roll control motor, a variable resistor operated by said motor, a roll gyro and a variable resistor operated thereby, said variable resistors being arranged in a bridge circuit, control means for said motor responsive to the potential across the output terminals of said bridge circuit, a variable resistor arranged to apply a potential of either polarity across said bridge output terminals, a yaw gyro and a heading selector motor arranged to differentially operate the last mentioned variable resistor to respectively impose automatic yaw control and selection of heading upon said motor control means, a second bridge circuit comprising a circular resistor having two pairs of contacts rotatable thereon, one of said pairs constituting the input terminals of the second bridge circuit and the other of said pairs the output terminals thereof, control means for said heading selector motor responsive to the potential across said output terminals of the second bridge circuit, one of said pairs of contacts being rotatable by said heading selector motor, stepping means for rotating the other one of said pairs of contacts, means for selectively operating said stepping means, and other means for controlling said heading selector motor independently of said second bridge circuit.

3. In combination with an aircraft having a roll control motor, a variable resistor operated by said motor, a roll gyro and a variable resistor operated thereby, said variable resistors being arranged in a bridge circuit, control means for said motor responsive to the potential across the output terminals of said bridge circuit, a variable resistor arranged to apply a potential of either polarity across said bridge output terminals, a yaw gyro and a heading selector motor arranged to differentially operate the last mentioned variable resistor to respectively impose automatic yaw control and selection of heading upon said motor control means, a second bridge circuit comprising a circular resistor having two pairs of contacts rotatable thereon, one of said pairs constituting the input terminals of the second bridge circuit and the other of said pairs the output terminals thereof, control means for said heading selector motor responsive to the potential across said output terminals of the second bridge circuit, one of said pairs of contacts being rotatable by said last-mentioned motor, and stepping means for rotating the other one of said pairs of contacts to cause incremental turns of the aircraft.

4. In an aircraft control system, a roll control motor, roll and yaw gyros, variable resistor means operated by the motor and the roll gyro, said variable resistor means being arranged in a bridge circuit and the motor being arranged to operate in response to the potential across the output terminals of the bridge circuit whereby control by the roll gyro is imposed upon the motor, variable means for applying a potential across said output terminals, a heading selector motor and said yaw gyro arranged to differentially operate said variable means for imposing heading selection and yaw control respectively upon the motor, and means for selectively operating said heading selector motor continuously or by predetermined increments.

5. In an aircraft control system, a roll control motor, a roll gyro and a yaw gyro, motor control means operated jointly by said roll gyro and said motor for normally maintaining the aircraft in an unbanked attitude, means for biasing said motor control means, a heading selector motor and said yaw gyro arranged to operate differentially said biasing means for imposing heading selection and yaw control respectively upon the roll control motor, and means for selectively operating said heading selector motor continuously or by predetermined increments.

6. In an aircraft control system, a roll control motor, roll and yaw gyros, variable resistor means operated by the motor and the roll gyro, said variable resistor means being arranged in a bridge circuit and the motor being arranged to operate in response to the potential across the output terminals of the bridge circuit whereby control by the roll gyro is imposed upon the motor, variable means for applying potential across said output terminals, and a heading selector motor and said yaw gyro arranged to operate said variable means differentially for respectively imposing heading selection and yaw control upon the motor.

7. In an aircraft control system, a roll control motor, a roll gyro and a yaw gyro, motor control means operated jointly by said roll gyro and said motor for normally maintaining the aircraft in an unbanked attitude, means for biasing said motor control means, and a heading selector motor and said yaw gyro arranged to differentially operate said biasing means for imposing heading selection and yaw control respectively upon the roll control motor.

8. In combination with an aircraft having a roll control motor, a variable resistor operated by said motor, a roll gyro and a variable resistor operated thereby, said variable resistors being arranged in a bridge circuit, control means for said motor responsive to the potential across the output terminals of said bridge circuit, a variable resistor arranged to apply a potential of either polarity across said bridge output terminals, and a yaw gyro and heading selector means arranged to differentially operate the last mentioned variable resistor to respectively impose automatic yaw control and selection of heading upon said motor control means.

9. In combination with an aircraft having a roll control motor, a variable resistor operated by said motor, a roll gyro and a variable resistor operated thereby, said variable resistors being arranged in a bridge circuit, control means for said motor responsive to the potential across the output terminals of said bridge circuit, a variable resistor arranged to apply a potential of either polarity across said bridge output terminals, a yaw gyro and heading selector means arranged to differentially operate the last mentioned variable resistor to respectively impose automatic yaw control and selection of heading upon said motor control means, and said heading selector means including stepping means for causing incremental operation of said last mentioned variable resistor.

10. In combination with an aircraft control system having a reversible heading selector motor, a pair of polarized relays arranged in parallel to control said last-mentioned motor for operation in either direction, bridge circuit comprising a circular resistor having two pairs of contacts rotatable thereon, one of said pairs constituting the input terminals of the bridge circuit and the other of said pairs the output terminals thereof, one of said relays being connected across said output terminals of the bridge circuit, one of said pairs of contacts being rotatable by said motor, stepping means for rotating the other one of said pairs of contacts, and means for selectively operating said stepping means and the other of said relays to thereby selectively cause incremental turns and continuous turns of the aircraft.

AARON SIVITZ.
PHILIP L. RUBY.

REFERENCES CITED

The following references are of record in the file of this patent:

UNITED STATES PATENTS

| Number | Name | Date |
|---|---|---|
| 1,568,972 | Hammond, Jr. | Jan. 12, 1926 |
| 1,924,857 | Hodgman | Aug. 29, 1933 |
| 2,257,277 | Righter et al. | Sept. 30, 1941 |
| 2,452,311 | Markusen | Oct. 26, 1948 |
| 2,471,821 | Kutzler et al. | May 31, 1949 |